United States Patent
Sarto

[11] 3,730,156
[45] May 1, 1973

[54] EXHAUST GAS RECYCLING

[75] Inventor: Jorma O. Sarto, Orchard Lake, Mich.

[73] Assignee: Chrysler Corporation, Highland Park, Mich.

[22] Filed: Nov. 24, 1971

[21] Appl. No.: 201,826

[52] U.S. Cl. .............................................123/119 A
[51] Int. Cl. .....................................F02m 25/06
[58] Field of Search...................................123/119 A

[56] References Cited

UNITED STATES PATENTS

| | | | |
|---|---|---|---|
| 2,154,417 | 4/1939 | Anderson | 123/119 A |
| 2,317,582 | 4/1943 | Bicknell | 123/119 A |
| 3,204,621 | 9/1965 | Holliday | 123/119 A |
| 3,237,615 | 3/1966 | Daigh | 123/119 A |
| 3,444,846 | 5/1969 | Sarto et al. | 123/119 A |
| 3,662,722 | 5/1972 | Sarto | 123/119 A |

Primary Examiner—Wendell E. Burns
Attorney—Talburtt and Baldwin

[57] ABSTRACT

An automobile engine recycles a fraction of its exhaust gases by means of a restricted bypass duct discharging into the fuel-air inlet conduit at the diffuser region of the customary fuel inducing venturi restriction. The recycled exhaust gas flow is modulated by the pressure differential across a metering restriction between the exhaust gas source and the venturi restriction. A supplemental control valve responsive to the pressure differential between the venturi restriction and a control port, which opens into the inlet conduit immediately above the leading edge of a conventional butterfly type throttle valve, is employed in the bypass duct to close or restrict the latter when the throttle valve is at either its idle or wide open position. The source of exhaust gas for recycling may comprise comparatively cool exhaust gases collected in a dead-end sound attenuating chamber of the exhaust muffler, which chamber is in communication with the hot exhaust gases in the muffler but is out of the direct exhaust flow path, such that lead contaminants in the exhaust gases cool and solidify in the chamber as minute particles that readily flow through the metering restriction in the bypass duct.

10 Claims, 2 Drawing Figures

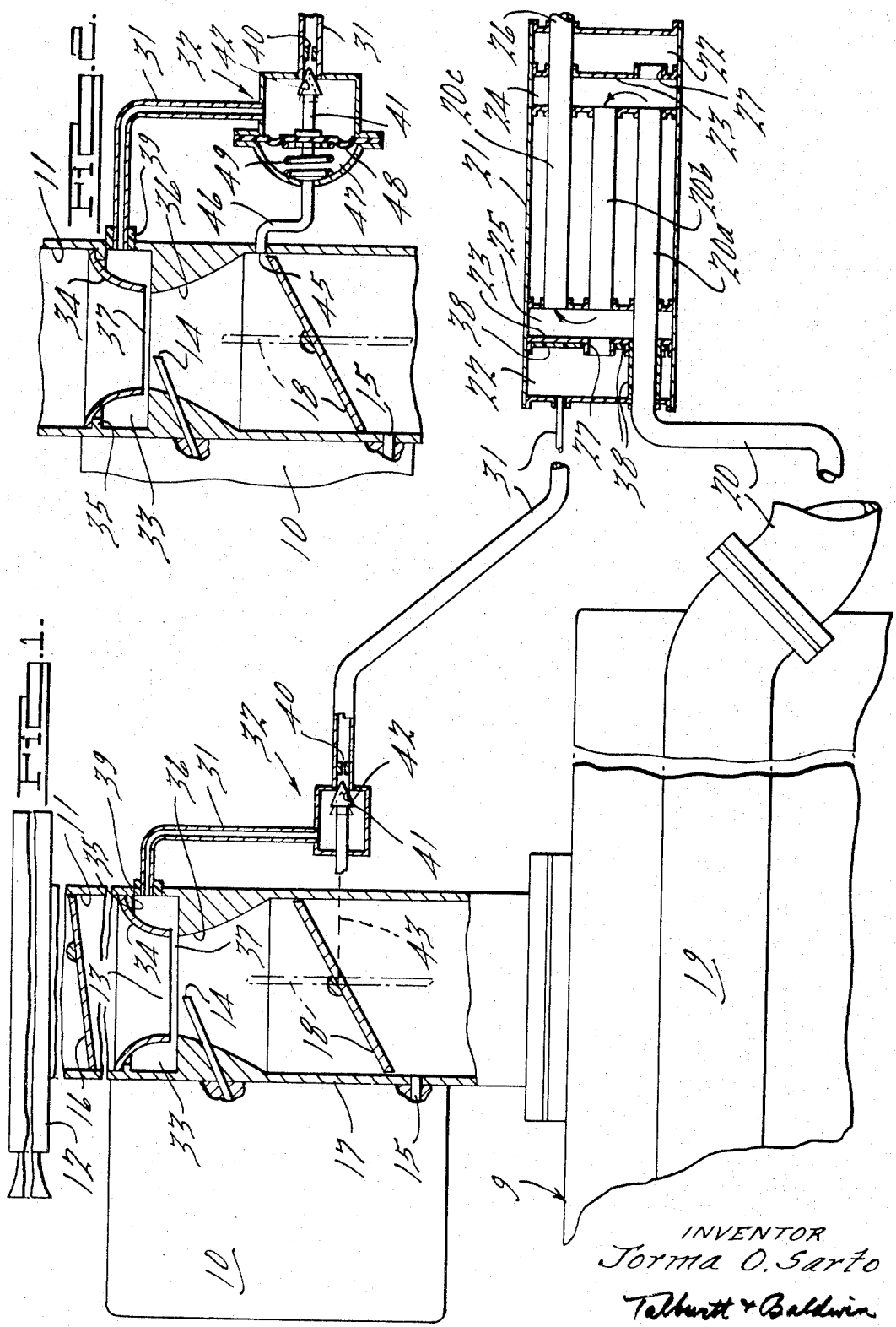

EXHAUST GAS RECYCLING

BACKGROUND AND SUMMARY OF THE INVENTION

In the prior art, numerous systems have been devised to recycle exhaust gas into the fuel-air induction system of an automobile engine for the purposes of pre-heating and vaporizing the incoming air-fuel mixture to facilitate its complete combustion in the combustion zone, for re-using the unignited or partially burned portions of the fuel which would otherwise pass out the exhaust pipe and into the atmosphere, and for reducing the oxides of nitrogen emitted from the exhaust system into the atmosphere. It has been found that approximately 15 percent exhaust gas recycling is required at moderate engine loads to substantially reduce the nitrogen oxide content of the exhaust gases discharged in the atmosphere, that is, to below about 1000 parts per million.

Although the prior art structures have had the desired effect of reducing nitrogen oxides in the exhaust by reducing the maximum combustion temperature in consequence of diluting the fuel-air mixture with recycled exhaust gases during certain operating conditions of the engine, these structures have not been commercially acceptable from the standpoints of both cost and operating efficiency and have been complicated by the accumulation of gummy deposits comprised largely of lead oxides which clog the restricted bypass conduit provided for recycling the exhaust, and have also been complicated by the desirability of reducing the recycling during conditions of both engine idling when nitrogen oxide emission is a minor problem and wide open throttle when maximum power is required, while progressively increasing the recycling of exhaust gases with increasing engine load at part open throttle. The nitrogen oxide emission is a direct function of combustion temperature and for that reason is less critical during engine idling when the rate of fuel combustion and the consequent combustion temperature are minimal, and during wide open throttle conditions which are ordinarily of short duration.

In the usual gasoline or hydrocarbon fuel type engine, fuel combustion can take place at about 1200°F. The formation of nitrogen oxides does not become particularly objectionable until the combustion temperature exceeds about 2200°F., but the usual engine combustion temperature which increases with engine load or the rate of acceleration at any given speed frequently rises to about 2500°F. It is known that the recycling of at least one-twentieth and not more than one-fourth of the total exhaust gases through the engine, depending on the load or power demand, will reduce the combustion temperature to less than 2200°F.

Lead contaminants in the exhaust resulting from fuel additives desired for improved combustion characteristics normally exist in a gaseous state at combustion temperatures exceeding about 1700°F, but tend to condense and leave a gummy residue that is particularly objectionable at the location of metering orifices and valve seats in the exhaust recycling or bypass conduit when the temperature of the recycling exhaust gases falls much below 1700°F. It has been found that by cooling the exhaust gases to be recycled to between approximately 700°F and 550°F, the major portions of the lead bearing contaminants in the exhaust solidify as tiny particles susceptible of being readily carried in the stream of cooled recycling gases and through metering orifices or valve ports without collecting thereat.

An important object of this invention is to provide improved means comprising a minimum of moving parts for recirculating a portion of the combustion products from the exhaust system to the inlet system of an automobile engine, which is particularly adapted for use with lead containing fuel and which overcomes or avoids the problems and deficiencies of the prior art and achieves a number of important results including pre-heating and improved mixing and carburetion of the fuel-air mixture in the inlet header, the reduction of ice formation on the customary throttle blade, and the reduction of noxious nitrogen oxides in the exhaust.

Another object is to cool the recycled exhaust gases sufficiently to solidify a major portion of the lead contaminants prior to passing these gases through a restricted bypass duct and then to recycle the cooled gases into the inlet system while these gases are still hot relative to the atmosphere and preferably not less than about 200°F to 250°F at their introduction into the engine air inlet system, so as to be useful in preheating the inlet air. Accordingly the recycled gases may be recycled into the inlet air system at a location above the customary engine throttle valve to facilitate mixing and vaporization of liquid fuel droplets and to reduce ice formation at the throttle.

By virtue of the construction described, the pressure of the source of exhaust gases in the exhaust system will always be greater than atmospheric and will increase with increasing engine load. Thus the pressure differential between the upstream end of the bypass conduit for the recycling exhaust gas (at the exhaust system) and the downstream end of the bypass conduit (at the inlet air system) will be a function of engine load or fuel consumption and the recycling exhaust gas flow through the bypass conduit will be a corresponding function.

Another object of the invention is to introduce the recycling exhaust gas into the inlet air system at the diffuser region of the customary venturi restriction employed to induce fuel into the inlet air stream as a function of the venturi static pressure. The latter varies inversely with the throttle opening, which controls the inlet air flow. Accordingly the recycling exhaust flow through the bypass conduit will be an inverse function of the venture pressure, which enhances the pressure differential signal between the upstream and downstream ends of the bypass conduit and thereby effectively controls the bypass flow of the cooled exhaust gases. At idle operation of the engine when exhaust recycling is not desired, the pressure reduction at the venture and the pressure increase in the exhaust system are both nominal and the recycling exhaust flow will likewise be nominal, as desired.

Other objects are to provide such a construction comprising a bypass conduit having a fixed metering restriction for predetermining the recycling of exhaust gases in accordance with the aforesaid pressure differential, so as to dilute the inlet fuel-air mixture by more than 5 percent but less than 25 percent and usually by about 15 percent of the total exhaust gases to reduce the formation of nitrogen oxide during the combustion process when the engine is operating at part open throttle acceleration, and to provide a construction wherein a control valve responsive to the position of the engine throttle valve closes the bypass conduit when the throttle valve is at or near either the idle or wise open position and opens the bypass conduit throughout the major range of part throttle operation.

After a period of acceleration when the engine speed has attained the cruising condition, the combustion temperature and the pressure differential across the fixed metering restriction, as well as the total quantity of exhaust gases, decrease and the rate of exhaust recycling declines for improved fuel economy, again as described because less recycling is required to maintain the combustion temperature below the level at which nitrogen oxide formation is objectionable.

Another more specific object is to provide an improved exhaust recycling system wherein the bypass control valve comprises a pressure actuated diaphragm having one side in communication with a control port opening into the fuel-air inlet conduit adjacent and upstream of the leading or upstream edge of a conventional blade or butterfly type throttle valve when the latter is at its idle position, such that upon progressive opening of the throttle valve from the idle position, the pressure at the control port will progressively drop from close to atmospheric pressure to a pressure approximating the reduced inlet pressure downstream of the throttle valve and will actuate the control valve to open the bypass conduit.

The recycled exhaust gases are discharged via a second port into the fuel-air inlet conduit at the venturi restriction. A second side of the pressure actuated diaphragm is in communication with the bypass conduit downstream of the metering restriction therein and also in communication with the second port opening into the venturi restriction, so that as the throttle valve opens progressively to increase the air flow through the venturi restriction, the progressively decreasing pressure thereat will correspondingly increase the exhaust flow through the bypass conduit. Finally, at or near wide open throttle operation, the reduced pressure at the venturi restriction will actuate the diaphragm to close the bypass control valve.

Other objects of this invention will appear in the following description and appended claims, reference being had to the accompanying drawings forming a part of this specification wherein like reference characters designate corresponding parts in the several views.

BRIEF DESCRIPTION OF THE DRAWING

FIG. 1, is a schematic fragmentary sectional view of an automobile engine embodying the present invention, the air inlet conduit, exhaust muffler, and exhaust recycling system being shown in longitudinal section.

FIG. 2, is a view similar to FIG. 1, showing a modification.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENTS

Referring to FIG. 1, an application of the present invention is illustrated by way of example with an automobile engine 9 having a carburetor 10 providing the inlet fuel-air induction conduit 11, which comprises the upstream portion of an inlet header for supplying a combustible fuel and air mixture to the engine. The carburetro 10 may comprise any conventional type which receives fresh air from the usual air filter 12 at the upstream end of the induction conduit 11 and comprises the usual main fuel metering system including the venturi restriction 13 and nozzles or jets 14 and 15 for supplying operating and idle fuel to the conduit 11 during various operating conditions and for enriching the fuel supply during acceleration and wide open throttle, and the usual atomatic choke (including unbalanced choke valve 16) and thermostatic means (not shown) for controlling idle enrichment and fast idle operation during cold starting conditions. An example of such a carburetor is illustrated by way of example in Ball U.S. Pat. No. 2,966,344, so that the foregoing conventional features disclosed in the latter patent are incorporated herein by reference and are not described in detail.

The downstream portion of the induction conduit 11 comprises the customary throttle body 17 containing the conventional blade or butterfly type throttle valve 18. The inlet fuel-air mixture is conducted via the inlet 11 to the engine cylinders for combustion therein, and the exhaust gases are conducted to the exhaust manifolds or headers 19, which discharge through an exhaust conduit 20 and muffler 21 to the atmosphere.

The muffler 21 is partitioned into one or more sound attenuating chambers 22 by internal baffles 23 and provides exhaust flow passages 20a, 20b and 20c connected by rear and front turn-around passages 24 and 25 to comprise a continuation of the exhaust conduit 20, connecting the same with the conventional tailpipe 26. The chambers 22 are substantially dead-end and are in communication by means of tuning ducts 27 with the hot exhaust gases in the muffler 21 but are out of the direct exhaust flow path, so that the exhaust gases within the chambers 22 are comparatively quiescent and rapidly lose heat to the atmosphere through the adjacent outer walls of the muffler 21.

A restricted bypass duct 31 has its upstream end in communication with the forward chamber 22 at a location preferably out of alignment with the associated duct 27 to receive the cooled exhaust gases for recycling the same through the engine 9 via a control valve 32. From the valve 32, the bypass duct 31 extends through the sidewall of the induction conduit 11 and into an annular distribution chamber 33 defined by an annular shell 34 comprising the upper portion of the carburetor venturi restriction 13. In the present instance the shell 34 seats on a locating projection 35 cast integrally with the body of the carburetor 10 and is spaced from a lower venturi portion 36 also cast integrally with the body of the carburetor 10. The space between the shell 34 and venturi portion 36 comprises a narrow annular slit 37 at the diffuser portion of the venturi restriction 13, whereby exhaust gases introduced into chamber 33 are distributed substantially uniformly around the axis of the inlet conduit 11 to effect optimum mixing of the exhaust gases and inlet air and to facilitate vaporization and mixing of liquid fuel droplets supplied via nozzle 14.

In order to facilitate cooling of the gases within the front chamber 22, the latter may be thermally insulated at 38 from the adjacent portions of the baffles 23 and conduit 20a. Similarly, in order to prevent heating of the carburetor body by the recycling exhaust gases, the downstream end of the bypass duct 31 may be insulated at 39 from the sidewall of conduit 11.

In accordance with the structure shown, the hot exhaust gases flowing from the header 19 to the muffler 21 are cooled appreciably during their passage along the exhaust passage 20. Thereafter a portion of these exhaust gases entering the front chamber 22 are additionally cooled as aforesaid within the latter chamber to temperatures between approximately 550° to 700°F. In one application of the present invention on an automobile operated at 90 miles per hour with ambient air temperatures of 90°F, the temperature in front chamber 22 was 550°F. By the time the exhaust gases conducted via duct 31 reached the induction conduit 11, their temperature was reduced to about 250°F. Accordingly, the recycled exhaust gases entering the induction conduit 11 via slit 37, although appreciably cooled with respect to the combustion temperature, were still sufficiently warm to facilitate vaporization and mixing of the inlet fuel.

As the throttle 18 opens with increasing engine load from the idle position shown, the exhaust pressure within muffler 21 will increase correspondingly to increase the flow of bypass gases through duct 31, which flow will be determined by the dimensions of restriction 40 in duct 31. Thus, without further considerations, the muffler exhaust pressure will modulate the bypass exhaust flow through duct 31 into conduit 11 as a function of engine load. In addition the pressure differential across restriction 40 is amplified as a function of engine load by a drop in the static pressure of the inlet gases at the venturi restriction 13. The restriction 40 is predetermined with respect to the operating pressures in the front chamber 22 and at the venturi 13, so that the resulting bypass exhaust flow will amount to at least 5 percent and not more than 25 percent of the total exhaust gas flow, depending upon the specific engine and its operating conditions. In the usual situation, effective reduction of nitrogen oxides in the combustion process is accomplished by recycling approximately 15 percent of the total exhaust gases; preferably through several slits arranged in the manner of the slit 37 where a multiple barrel carburetor is involved.

In order to block recycling of the exhaust gases at wide open throttle when the exhaust pressure is at a maximum and the venturi pressure is a minimum, a control valve plunger 41 within the valve housing 32 is operably coupled with the throttle 18 to seat against an annular valve seat 42, defining a portion of conduit 31, to close the conduit 31. Any suitable coupling, as for example an operable mechanical linkage 43 indicated generally by the dotted connection between the valve 18 and plunger 41, may be employed to move plunger 41 against the valve seat 42 and close the conduit 31 when the throttle valve 18 moves to either its idle position shown or to the wide open position indicted in phantom. By virtue of the location of the restriction 40 adjacent and upstream of the plunger 41 and seat 42, the restriction 40 is readily accessible for adjustment or modification.

FIG. 2, illustrates a modified control for the valve plunger 41 responsive to positions of the throttle 18 0 In FIG. 2, a control port 45 opens into the conduit 11 adjacent the upper or leading edge of the throttle valve 18 so as to be in the high pressure region of the conduit 11 when the valve 18 is at the idle position shown in solid lines. Upon opening of the throttle valve 18, the pressure at port 45 gradually decreases throughout a range of part open throttle positions and then gradually increases as the throttle valve 18 nears the wide open position illustrated in phantom.

The port 45 is connected by conduit 46 with a pressure chamber 47 having one wall defined by a flexible diaphragm 48. The diaphragm 48 is connected with plunger 41 and is normally urged rightward by spring 49 against the seat 42 to close the bypass duct 31. Spring 49 normally urges plunger 41 to the seated position to close bypass duct 31, but during part throttle operating conditions, the low pressure at port 45 is transmitted to diaphragm 48 to move plunger 41 leftward from the seat 42 and open the duct 31 for recycling the comparatively cool exhaust gases from the chamber 22.

The diaphragm 48 also defines one wall of a second chamber comprising control valve 32 in communication with both the bypass duct 31 at a location downstream of metering restriction 40 and also with the venturi restriction 13, as described above in regard to FIG. 1. As the throttle 18 moves to or near the wide open position, the decreased pressure at venturi restriction 13, the increased pressure at port 45, and spring 49 urge valve 41 rightward to the closed position, thereby to prevent bypass flow at the wide open throttle position.

I claim:

1. In an internal combustion engine,
   A. an inlet circuit for conducting a fuel-air mixture into said engine for combustion therein and having a venturi restriction,
   B. a throttle valve downstream of said venturi restriction and movable between idle and open positions,
   C. a control port opening into said inlet conduit at a region whereat the fluid pressure is reduced upon part opening of said throttle valve from said idle position,
   D. an exhaust conduit for discharging hot exhaust gases from said engine,
   E. means for effectively inhibiting the formation of nitrogen oxides during said combustion by recirculating exhaust gases into said inlet conduit to limit the temperature of said combustion comprising bypass duct means having a metering restriction,
   F. said bypass duct means having one end opening into said exhaust conduit to receive exhaust gases therefrom and having a second end opening into said inlet conduit at the region of said venturi restriction to modulate the flow of exhaust gases into said inlet conduit as a function of the fluid pressure at said venturi restriction and at said one end,
   G. bypass valve means normally closing said bypass duct means, said bypass valve means being responsive to the reduced fluid pressure at said control port for opening said bypass duct means upon part opening of said throttle valve and being responsive to said fluid pressure at said venturi restriction to close said bypass duct means upon wide opening of said throttle valve.

2. In the combination according to claim 1, cooling means upstream of said metering restriction for cooling said exhaust gases in said bypass duct means sufficiently to solidify a major portion of lead contaminants therein, said bypass duct means downstream of said cooling means being arranged to conduct the cooled exhaust gases through said metering restriction and into said inlet conduit at temperatures between 200°F and 700°F.

3. In the combination according to claim 1, said bypass valve means comprising pressure actuated means having one portion responsive to the fluid pressure at said control port for actuation thereby and having another portion responsive to the fluid pressure at said venturi restriction and also in communication with said bypass duct means downstream of said metering restriction, and movable means responsive to actuation of said diaphragm for opening and closing said bypass duct means.

4. In the combination according to claim 3, said throttle valve comprising a blade type valve pivotal in said inlet conduit and having an upstream edge, said control port opening into said inlet conduit adjacent said upstream edge.

5. In the combination according to claim 1, said bypass valve means having a movable member shiftable for opening and closing said bypass duct means, biasing means for normally urging said member to close said bypass duct means when said throttle valve is at said idle position, and pressure actuated means operably coupled with said member to shift the same, said pressure actuated means having one portion in communication with said control port and responsive to the reduced fluid pressure thereat when said throttle valve is partly open to shift said member to open said bypass duct means, said pressure actuated means having a second portion in communication with said venturi restriction and responsive to the fluid pressure thereat when said throttle valve is wide open to shift said member to close said bypass duct means.

6. In the combination according to claim 5, said second portion and said bypass duct means downstream of said metering restriction having the same means for communicating with said venturi restriction.

7. In the combination according to claim 6, cooling means upstream of said metering restriction for cooling said exhaust gases in said bypass conduit means sufficiently to solidify a major portion of lead contaminants therein.

8. In the combination according to claim 6, said throttle valve comprising a throttle blade pivotal within said inlet conduit at a location downstream of said venturi restriction and having a leading edge movable in an upstream direction upon opening movement of said throttle blade from its idle position, said control port opening into said inlet conduit adjacent said leading edge and within a high pressure region of said inlet conduit when said throttle blade is at its idle position, said leading edge being movable upstream of said control port to effect said reduced pressure thereat throughout a limited range of opening movement of said throttle blade from said idle position.

9. In the combination according to claim 8, said metering restriction having a predetermined fixed dimension and being located upstream of said shiftable member.

10. In the combination according to claim 9, means upstream of said metering restriction for cooling said exhaust gases in said bypass conduit means to a temperature between 550°F and 700°F.

* * * * *